Sept. 20, 1971   J. R. ARSCOTT   3,606,139
LAMINATED WEBS

Filed Sept. 8, 1969   3 Sheets-Sheet 1

INVENTOR
JOHN ROWLAND ARSCOTT

BY
Cushman, Darby & Cushman
ATTORNEY

Sept. 20, 1971  J. R. ARSCOTT  3,606,139
LAMINATED WEBS
Filed Sept. 8, 1969  3 Sheets-Sheet 2
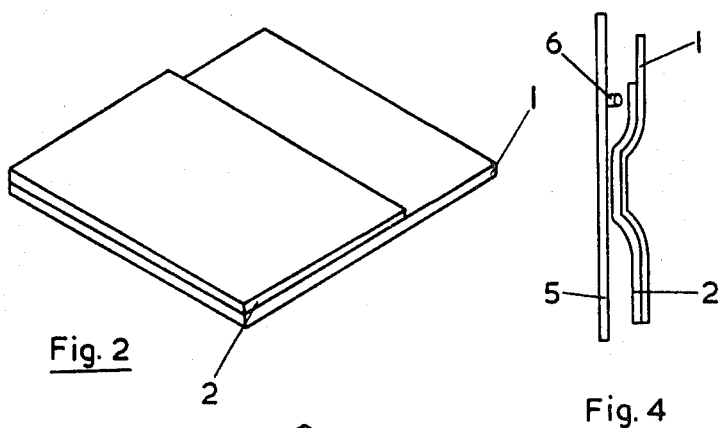
Fig. 2
Fig. 4
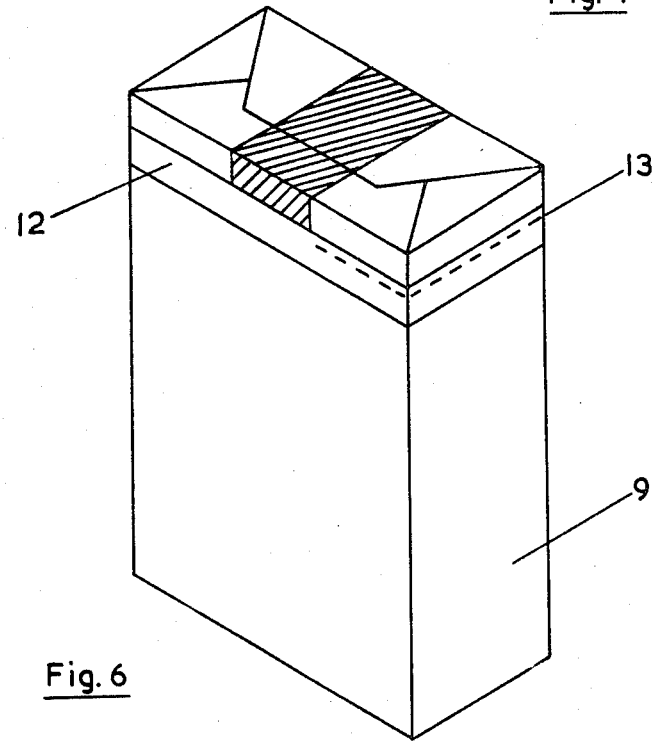
Fig. 6
INVENTOR
JOHN ROWLAND ARSCOTT
BY
Cushman, Darby & Cushman
ATTORNEYS United States Patent Office 3,606,139
Patented Sept. 20, 1971

3,606,139
LAMINATED WEBS
John Rowland Arscott, Welwyn Garden City, England, assignor to Imperial Chemical Industries Limited, London, England
Filed Sept. 8, 1969, Ser. No. 856,069
Claims priority, application Great Britain, Sept. 17, 1968, 44,092/68
Int. Cl. B65d 65/42, 85/10
U.S. Cl. 229—87C
12 Claims

ABSTRACT OF THE DISCLOSURE

A laminated web containing a layer of wrapping film and comprising a series of blanks, each of which may be folded to form a packet—especially a cigarette packet.

---

The present invention relates to laminated webs consisting of a series of blanks, each of which may be folded to form a packet. The present invention also relates to the individual blanks which may be obtained from the web.

This invention is particularly applicable to blanks which may be folded and sealed to form cigarette packets. Conventionally soft cigarette packets are made in three stages. Firstly, a laminate of paper and thin metal foil is cut to the required size and erected about a former, a blank of printed paper or decorated foil/paper laminate is then erected around the first layer and adhesively sealed thereto and finally the pack is overwrapped in a transparent film, which is generally provided with a tear tape to facilitate opening. The present invention is directed to providing improved blanks from which packets may be formed in an operation which does not involve such a large number of forming operations.

According to the present invention we provide a web comprising a series of laminar blanks, each of which when severed from the web may be folded to form a packet which may be sealed to become self supporting in which the layer of the laminate which is to form the outermost layer (hereinafter called the "outermost layer") of the packet is of a larger surface area than the remaining layer or layers of the laminate and is coated with a sealable material which becomes positioned between two pieces of said outermost layer where it is necessary to make a seal when the blank is folded to form a packet.

The present invention also provides a laminar blank capable of being folded to form a packet, the layer of the laminate which forms the outermost layer of the packet being of larger surface area than the remaining layers of the laminate and being coated with a sealable material in such a way that when the blank is folded to form a packet the sealable material is present between two pieces of the outermost layer which may be sealed to render the packet self-supporting.

The present invention is particularly applicable to blanks which may be folded to form what are known as "soft cigarette packs." In this instance the blanks may conveniently comprise a first layer of a laminate of paper and thin metal foil, which will be next to the cigarettes, so that the metal foil provides a vapour barrier around the cigarettes, a second layer bearing any decorative design or printing that is required on the pack and a third, outermost layer of protective transparent material. This outermost layer should extend beyond the edges of the other layers of the laminate and should be coated with a sealable material at least over some of the parts of its surface which extend beyond the other layers. Thus, the blanks of the present invention are not laminar over their entire surface. In this way, when the blank is folded to form the packet, a coated region of the outermost layer will overlap with another part of the outermost layer of the packet so that these two zones may be sealed to each other to form the packet. The sealable material may be coated onto one or both sides of the outermost layer of the laminate, the important consideration being that when the blank is folded into packet form the areas which must be sealed to render the packet self supporting consist of two pieces of the outermost layer superimposed with the sealable material therebetween. The sealable material may be coated onto either one or both of the superimposed pieces of the outermost layer of the laminate.

When we say that the packet should be self supporting, we mean that the tendency for the blank to unfold and revert to its original form has been overcome by sealing the overlapping margins of the blank when it has been folded to form the packet. Generally, when a blank is folded to the required shape, it tends to unfold along the fold lines and revert to its flat form. Our packets are considered to be self supporting when this tendency has been overcome by sealing the overlapping margins of the folded blank. The laminated blanks of the present invention have a particular advantage in that it is the outermost layer of material which forms the seal. In many previously known blanks the seal has been formed between a piece of the outermost layer and a piece of the inner layer of the blank. This form of package suffers from the disadvantage that when the packet is assembled the overlapping pieces of the outermost layer are not sealed directly to each other and the package has exposed rough edges. If these packages are subjected to rough handling the layers may tend to readily delaminate producing rough edges on and in some instances tearing the package. This tendency is largely overcome if the seal is formed between two pieces of the outermost layer of the laminate.

We prefer that the outermost layer of the laminate is of a transparent material. In this way any decorative design or printing that is required to be imparted to the packet may conveniently be printed onto a layer of the blank which is laminated to a transparent outer layer so that the design may readily be seen. Alternatively, the design may be reverse printed onto the transparent layer.

The webs of the present invention may be a continuous web, preferably of transparent material to which are laminated at regular intervals, pieces of the other layers, each of which, together with the transparent material is to form one packet. The individual blanks may then be severed from the web along the lines between the pieces of the other layers so that when they are folded to form the packet, the zone which is transverse to the length of the web and which is not laminated to the other components of the blanks will form an overlapping zone of the packet when the web is folded and a seal may be effected along that overlapping zone. The web of transparent material should also be wider than the pieces of the other layers of the blank which are laminated thereto. The web may extend to one of both sides of the pieces of the other layers as is suitable for the package in question. Alternatively, the web may comprise a continuous web of transparent material laminated to a narrower continuous web of the other component of the laminate. In this instance the web of the other component should be suitably cut away so that a zone of the transparent material, which is transverse to the length of the web is exposed in such a position that it forms the overlapping portion of the blank when it is folded to form the packet. In both these instances, the transparent web should be coated with a sealable material at least at the areas where the seals are to be formed when an individual blank is folded to form a packet, conveniently it is coated on its side that is laminated to the other components of the laminate. It is not essential that the coating material should be present over the entire surface of the transparent web but it should be present at least along those zones along which a seal is to be effected.

The various layers of each blank may be cut and perforated as may be required for the blank to be folded to form a package of the required shape. For instance in the production of soft cigarette packs, the layer of the laminate of paper and thin metal foil, which is to be next to the cigarettes may conveniently be cut along its edges so that they may readily be folded to provide the top and bottom of the pack without the folds being excessively bulky.

In the formation of some forms of packet and especially cigarette packets, it is desirable to provide a tear tape whereby the packet may be opened. Conveniently, the tear tape is included as part of the laminated web and extends throughout the length of web. We prefer that when packets are formed from blanks according to the present invention, the tear tape is stuck to the inside surface of the outer layer of the packet, preferably at a point where the outer layer is not laminated to any other layer. In this way the outer layer of the packet may be severed by withdrawing the tape around the packet. Conveniently all the layers of the laminate except the outermost layer are cut away at the point where the tear tape crosses the zone along which the web is severed transversely to produce an individual blank. In this way the tear tape will extend a little way beyond the edge of the blank so that when it is folded to form the packet the end of the tear tape is free and provides a tab whereby the tear tape may readily be withdrawn around the packet. Alternatively the tear tape may extend transversely to the length of the web in which case it is necessary to provide a single tear tape for each blank. This type of tear tape may conveniently be used in conjunction with an improved method of providing an opening in the package. In this improved method perforations are formed in part of the layers of the laminate other than the outermost layer around the zone defined by the tear tape. These perforations are formed so that they will only extend around a part of the package when it is assembled, in this way when the tear tape is removed the perforations are exposed and may be broken to provide an opening in the packet.

The various layers of the laminate may be of any suitable material, depending upon the use to which the packet formed by folding the blank is to be put. For example, if the packet is to be a cigarette packet, the inner layer is preferably a laminate of paper and thin metal foil which acts as a vapour barrier layer, the next layer is preferably of paper onto which any lettering and/or decorative design may be printed. Finally, the outside layer is of a transparent, protective material and may be a film of a cellulose derivative or of a thermoplastic material such as biaxially oriented polypropylene.

The sealable material may be a material that is sealed by the application of heat and pressure, by the application of pressure alone or by forming the seal with a solvent. The sealable material may be part of the continuous web or may be applied to the web as it is being fed to the wrapping station; this second alternative should be used if the seal is to be formed by the application of pressure alone. It is not necessary that the sealable material should be present over the entire surface of each blank and it is sufficient that the material be present only along the lines where the seals are to be formed; webs coated over their entire surface with sealable material may be used, the webs may be coated on one or both of their surfaces.

The present invention is illustrated but in no way limited by reference to the accompanying drawings in which FIG. 1 shows a plan view of a length of a web comprising two blanks, each of which may be folded to form a cigarette packet.

FIG. 2 is a perspective view of the laminate of FIG. 1.

FIG. 4 shows a cross section through A–A' of FIG. 3.

FIG. 6 shows a cigarette packet assembled from a blank obtained from the web shown in FIG. 5.

Figure 1:
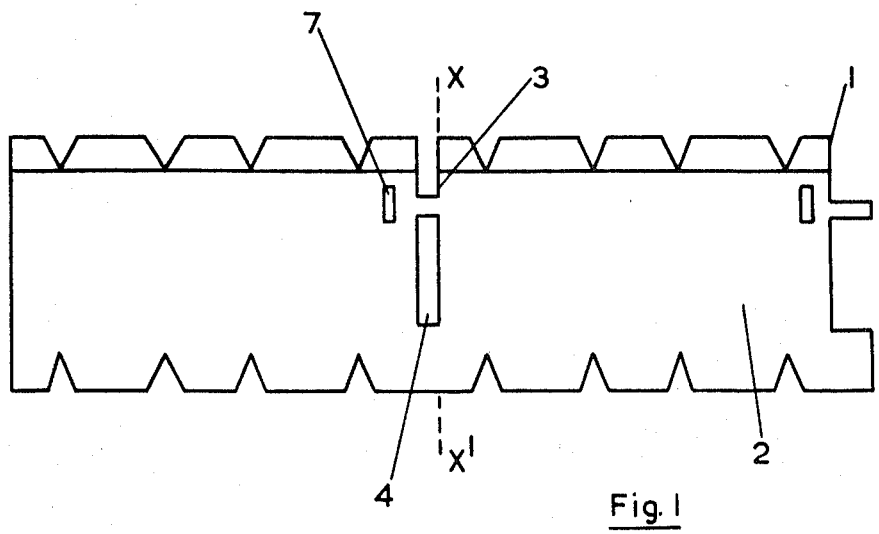

Referring now to FIG. 1, the laminate shown comprises a first layer 1 which is itself a laminate of paper and thin metal foil and is laminated to a layer of paper 2. The layer of the laminate of paper and foil 1 overlaps the layer of paper as is illustrated in FIG. 2. The edges of the paper/foil layer which extend beyond the other layer and the edges of the laminated portion are cut away so that they may readily be folded to form the top and bottom of the package. The laminate is also cut away as shown at 3 and 4 so that when it is severed along the line X–X' to produce an individual blank, the edge of the blank has the shape of the right hand end of the web illustrated in FIG. 1.

Figure 3:
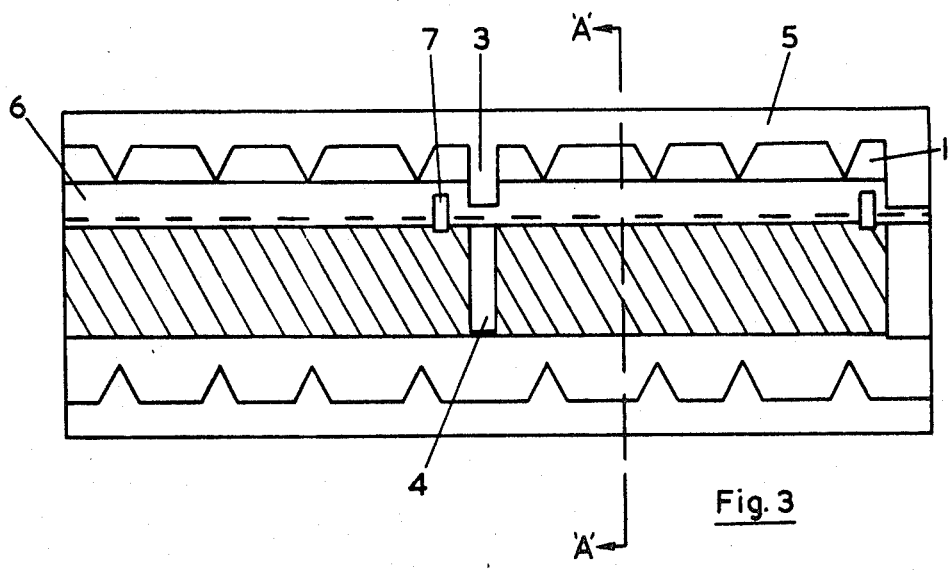
FIG. 3 shows the laminate of FIG. 1 laminated to a third layer and also with a tear tape.

FIG. 3 illustrates the web shown in FIG. 1 further laminated to an outermost layer of film 5 which is secured to the layer of paper 2 of the laminate shown in FIG. 1; the layer of film 5 is coated with a sealable material over the whole of its surface on the side which is laminated to the layer 2. FIG. 4 shows a section on A–A' of FIG. 3 and as may be seen, the layer of film 5 is wider than the laminate of FIG. 1 but is only laminated to the paper layer 2 over its central portion as is illustrated by the shaded area of FIG. 3. A tear tape 6 is secured to the layer of film 5 and passes through the bridge formed between the cut away portions 3 and 4 formed in the laminate illustrated in FIG. 1. The cut out 7 is formed in the laminate of FIG. 1 so that cuts may be made extending from 7 to either side of the bridge formed between the cut away portions 3 and 4 so that the material forming that bridge will drop out thus leaving a tab of film through which the tear tape runs.

Thus, in the formation of a packet the laminate is assembled as shown in FIGS. 3 and 4 and fed from a reel to a wrapping machine, as the laminated web is being fed to the machine cuts are first made in the blank nearest the wrapping station, these cuts extending from the hole 7 to the cuts on either side of the bridge between 3 and 4. The blank is then severed from the web by cutting along line X–X' (see FIG. 1) and then fed to the wrapping station where it is folded to form the packet. When the blank has been folded, the film behind the cut away areas 3 and 4 will be overlapping the film at the other end of the blank and the portions of the film which extend beyond the sides of the web will overlap at the top and the bottom of the web. The film is coated with a sealable material so that these overlapping portions may be sealed to produce a self supporting packet.

Figure 5:
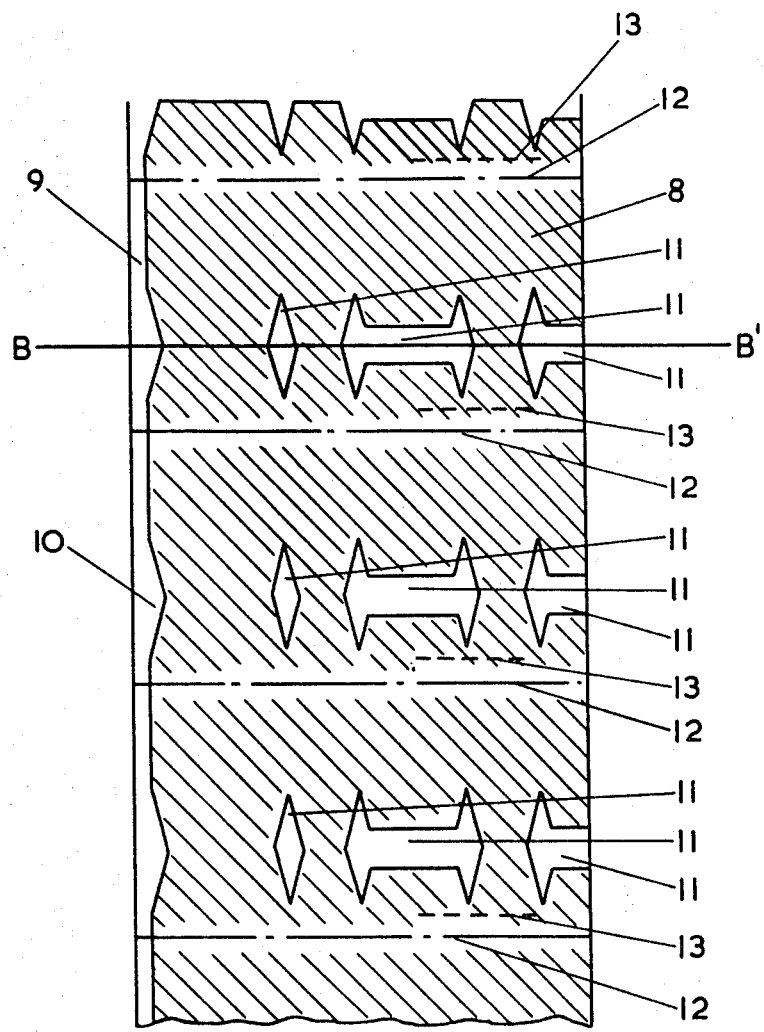
FIG. 5 shows an alternative form of web according to the present invention.

FIG. 5 illustrates an alternative form of web according to the present invention. The web shown consists of a layer 8 which is a laminate of paper and aluminium foil and which is itself laminated to an outermost layer of biaxially oriented polypropylene film 9; the polypropylene film is wider than the layer 8 so that there is a zone 10 of exposed, unlaminated film. The film 9 is coated with a sealable material along this zone 10. The layer 8 is also formed with cut away portions 11 so as to expose areas of the film 9 which will form the overlapping zones when the blanks are folded into packages. Tear tapes 12 are also provided at the required position along the web.

The individual blanks are severed from the web by cutting transversely to the length of the web through the centre of the cut away portions 11 along the line B–B'. This therefore provides a blank having one edge as shown at the top end of the web in FIG. 5 and the other edge defined by the cut along B-B'. To enable easy opening of packages formed from these blanks the layer 8 is formed with perforations 13 at the position where it will subsequently be broken to open the package.

The individual blanks obtained from the web may readily be folded to form a packet as illustrated in FIG. 6. The seals which render the packet self-supporting being formed along the unlaminated zones of the layer 9. The packet may easily be opened by withdrawing the tear tape 12 around the packet to break the protective outer wrapper 9. Removal of the tear tape 12 exposes the perforations 13 so that the inner wrapping material 8 may be broken along these perforations to open the package.

One of the advantages of the present invention is that thin papers, foils and films may be used to construct the laminate. Thickness and stiffness is normally only necessary in the individual layers of a conventional pack so that they can be handled on the packing and wrapping machines. Thus, provided the total laminate may be handled satisfactorily, the individual component thickness can be reduced to a minimum.

I claim:

1. A web comprising a series of laminar blanks, each of which when severed from the web may be folded to form a packet which may be sealed to become self-supporting in which the layer of the laminate which is to form the outermost layer of the packet is of larger surface area than a remaining layer of the laminate and is coated with a sealable material which becomes positioned between two pieces of said outermost layer where it is necessary to make a seal when the blank is folded to form a packet.

2. A web according to claim 1 in which the outermost layer is of transparent thermoplastic film.

3. A web according to claim 1 in which the remaining layers of the laminate are themselves laminated and comprise a first layer of a laminate of paper and thin metal foil and a second layer adjacent to the outermost layer.

4. A web according to claim 1 in which the outermost layer is wider than the remaining layers so that it extends transversely to both sides of the remaining layers.

5. A web according to claim 1 in which the remaining layers are themselves webs comprising a series of blanks and which are suitably cut away so that the areas of the inner surface of the outermost layer which overlap when the blank is folded to form a packet are exposed.

6. A web according to claim 1 in which the outermost layer of the web is coated with a sealable material only over the areas which overlap when a blank is folded to form a package and the sealable material lies between the overlapping pieces of the outermost layer.

7. A web according to claim 1 having a tape laminated longitudinally thereto to provide a tear tape on packages assembled from the blanks obtained from said web.

8. A web according to claim 7 in which all the layers of said web except the outermost layer are cut away at the point where the tape crosses the zones along which the web is severed to produce individual blanks.

9. A web according to claim 1 in which each blank which makes up the web is provided with a tear tape extending across the web in a direction transverse to its length.

10. A web according to claim 9 in which the layers of the laminate except the outermost layer are perforated across a part of their width adjacent to the tear tape.

11. Laminar blanks capable of being folded to form a packet, the layer of the laminate which forms the outermost layer of the packet being of larger surface area than a remaining layer of the laminate and being coated with a sealable material in such a way that when the blank is folded to form a packet the sealable material is present between two pieces of the outermost layer which may thus be sealed together to render the packet self-supporting.

12. Packets whenever assembled by folding and sealing a laminar blank according to claim 11.

References Cited

UNITED STATES PATENTS 2,321,112  6/1943  Tamarin _____ 229—51C

FOREIGN PATENTS 1,124,021  8/1968  Great Britain _____ 229—51AS

DAVID M. BOCKENEK, Primary Examiner

U.S. Cl. X.R.

229—51C; 206—412B